United States Patent [19]

Schulmeyr

[11] Patent Number: 5,087,468
[45] Date of Patent: Feb. 11, 1992

[54] PROCESS FOR AROMATIZATION OF TREATED TEA

[75] Inventor: Josef Schulmeyr, Wolnzach, Fed. Rep. of Germany

[73] Assignee: Hopfenextraktion HVG Barth, Raiser & Co., Fed. Rep. of Germany

[21] Appl. No.: 436,666

[22] Filed: Nov. 15, 1989

[30] Foreign Application Priority Data

Nov. 17, 1988 [DE] Fed. Rep. of Germany ....... 3838952

[51] Int. Cl.$^5$ ............................................. A23F 3/36
[52] U.S. Cl. .................................. 426/386; 426/597; 426/427; 426/428
[58] Field of Search ................ 426/386, 427, 428, 597

[56] References Cited

U.S. PATENT DOCUMENTS 3,532,506 10/1970 Louis-Rene et al. .
4,167,589 9/1979 Vitzthum et al. ............. 426/427 X
4,938,977 7/1990 Gehrig et al. .

FOREIGN PATENT DOCUMENTS 0167399 1/1986 European Pat. Off. .
2127642 10/1975 Fed. Rep. of Germany .
3339181 9/1985 Fed. Rep. of Germany .
3415844 10/1985 Fed. Rep. of Germany .
3414767 11/1985 Fed. Rep. of Germany .
3640333 9/1986 Fed. Rep. of Germany .
3413869 10/1986 Fed. Rep. of Germany .
3515740 11/1986 Fed. Rep. of Germany .
3640967 9/1988 Fed. Rep. of Germany .

Primary Examiner—Joseph Golian
Attorney, Agent, or Firm—Omri M. Behr

[57] ABSTRACT

Moistened black tea is decaffeinated using carbon dioxide as a solvent. The mixture consisting of caffeine, water, aroma constituents and gaseous carbon dioxide obtained in the course of the purification of the carbon dioxide (prior to recirculation of the latter) is removed from the separation tank and separated by raising the temperature at atmospheric pressure into an aqueous caffeine solution and a gaseous aroma fraction. The emanating carbon dioxide transports the aroma components, after a dew point depression by lowering the temperature, to decaffeinated, dried tea, to which the aroma constituents are impregnated.

8 Claims, 2 Drawing Sheets

PROCESS FOR AROMATIZATION OF TREATED TEA

FIELD OF THE INVENTION

In order to remove the caffeine from black tea, the finished tea which is ready for use, has to be subjected to several process steps which cause at least no improvement of its sensorial qualities.

DISCUSSION OF THE PRIOR ART

While until short time ago the hardly selective solvent methylene chloride (dichloromethane) has been used for decaffeination, in recent days condensed gases (mostly carbon dioxide) are used as solvents. By this means a significant improvement of the quality is achieved already because of the greater selectivity of the condensed gases.

Because of economic considerations, in many cases obtaining an aroma fraction from tea and re-adding it to decaffeinated tea is entirely dispensed with.

Thus, according to German OffenLegungsschriften 33 39 181, 34 15 844 and 35 15 740 carbon dioxide is merely pumped through a batch of moist tea leaves. After subsequent separation from the dissolved matter, the solvent is re-used.

By extraction at low temperatures it is attempted to keep the aroma loss as low as possible (DE-OS 34 14 869).

Another way of preserving the aroma consists in removing the caffeine already from the pre-product of the black tea, i.e. the green tea leaves (DE-OS 34 14 767, EP-A-167 399).

Obtaining an aroma fraction by using gaseous or liquid carbon dioxide with subsequent re-addition of the aroma solution has been known from U.S. Pat. No. 3,532,506. In this process, the aroma solution is added to an aqueous solution of tea or coffee constituents which are subsequently processed to instant products.

The first dearomatization of black tea and re-addition of the aroma to decaffeinated tea using supercritical carbon dioxide has been known from DE-PS 21 27 642 (U.S. Pat. No. 4,167,589).

For this purpose, in a first step the aroma constituents are removed by means of a dry, supercritical (with respect to pressure and temperature) gas, preferably carbon dioxide. In a second step, the caffeine is likewise removed from the moistened tea by supercritical, water-saturated carbon dioxide. Finally, the dried tea is re-impregnated with the aroma removed in the first step by charging the gas stream at a supercritical pressure with the aroma separated previously, which it liberated in the tea by demixing or liquefying the gas. As a prominent feature, it is stressed that those constituents of the tea which are responsible for flavor and color, e.g. tanning agents, flavines and rubigenes, are not extracted, i.e. they remain in the decaffeinated tea.

Because of the many process steps (the tea must at least twice be introduced into high pressure vessels and discharged therefrom) the expenditure is disproportionally high.

Thus it has been attempted to keep the aroma loss low by selectively removing the caffeine from the carbon dioxide charged therewith by means of ion exchangers (DE-OS 26 37 197). The aroma constituents remain soluble to a large extent and are recirculated together with the carbon dioxide. However, with this method it is disadvantageous that ion exchangers have a low charge capacity, i.e. have to be frequently replaced.

A further simple possibility aries from removing at first an aqueous aroma solution and subsequently the caffeine from tea by fractionated extraction (DE-OS 36 40 333). The aroma solution is then re-added to the decaffeinated, dried tea.

A similar process is known from DE-OS 36 40 967. In this case, aroma constituents are stripped from moist tea by a moist inert gas, e.g. $CO_2$, and re-impregnated onto the tea after it has been decaffeinated.

Both last-mentioned processes are, however, not satisfactory.

It is, therefore, the object of the invention to provide a process by which a decaffeinated tea having excellent sensorial qualities can be obtained in only few process steps.

SUMMARY OF THE INVENTION

According to the invention, an aromatic, decaffeinated tea is prepared by a process in which caffeine is removed from moistened tea by liquid or supercritical, recycled carbon dioxide at a pressure of 100 to 500 bars and a temperature of 0° to 100° C. and the carbon dioxide is purified prior to its recirculation by removing therefrom the dissolved caffeine and the aroma constituents dissolved together with the caffeine by lowering the pressure and/or raising the temperature or by lowering the pressure and scrubbing. The process is characterized in that a fraction containing the aroma constituents, water and carbon dioxide is separated from the mixture obtained during purification of the carbon dioxide and consisting of carbon dioxide, water and tea constituents, and that said fraction is added to dearomatized and decaffeinated tea for its rearomatization.

Preferred modes of carrying out the process according to the invention are described in the subclaims.

DESCRIPTION OF THE PREFERRED EMBODIMENTS

Figure 1:
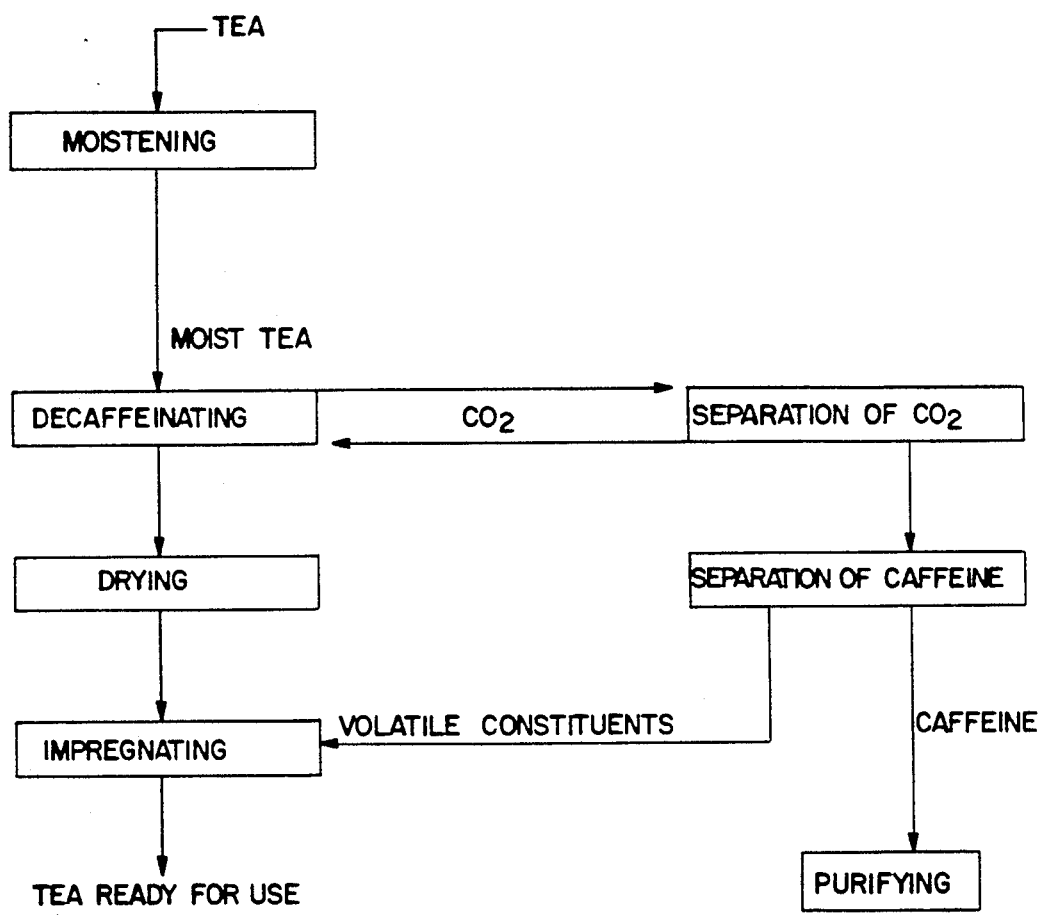
FIG. 1 is a flow sheet of the process according to the invention.

According to FIG. 1, caffeine is removed from moistened tea in a known per se manner by pumping liquid or supercritical carbon dioxide through a batch of tea. In a likewise known per se manner, the carbon dioxide is purified from caffeine and from portions of the aroma constituents by impairing the solubilizing properties of the solvent, e.g. by lowering the pressure or by raising the temperature (possibly together with lowering the pressure), or by scrubbing out the caffeine.

During recirculation of the carbon dioxide, the separated tea constituents, i.e. caffeine and the aroma components, are periodically or continuously removed from the pressurized separation tank such that the caffeine is obtained as a sludge, while the volatile aroma constituents are removed together with the gaseous carbon dioxide and can be re-added to a tea which has already been decaffeinated prior to, during or after drying the tea.

Figure 2:
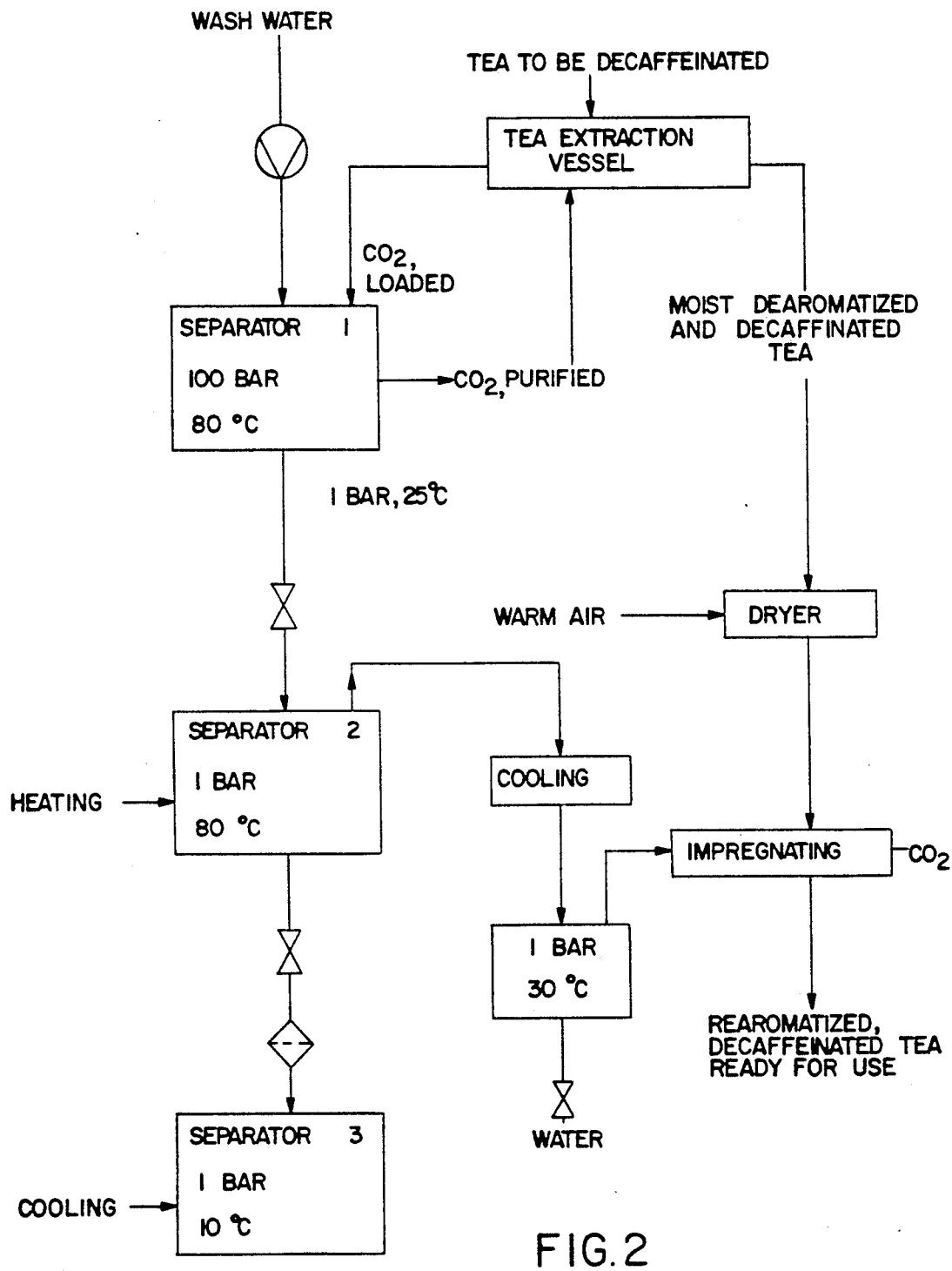
FIG. 2 is a flow sheet of a preferred mode of carrying out the process according to the invention.

The invention is further illustrated by the following working example in connection with FIG. 2 without limitation to the preferred parameters given in the example.

EXAMPLE

In a high-pressure tea extraction vessel having a useful volume of 500 liters, condensed carbon dioxide of a temperature of 27° C. and a pressure of 250 bars is flown through 100 kg of moistened black tea. In the subsequent pressure vessel (Separator 1) the pressure is, for separating the solvent from the dissolved tea constituents, lowered to 100 bars, while the temperature is raised to 80° C. Simultaneously, about 10 liters of water per hour are injected into the upper part of separator 1. The carbon dioxide leaves the vessel as a purified stream and is recycled to the extraction vessel.

Through an opening in the bottom of separator 1, a mixture consisting of caffeine, water, aroma components and carbon dioxide is left out about every half an hour with expansion to atmospheric pressure into a collecting vessel (Separator 2). This collecting vessel (Separator 2) is heated to a temperature 80° to 90° C., so that a) the removed caffeine is completely dissolved and
b) the volatile aroma components can escape together with the emanating carbon dioxide.

The remaining caffeine solution is let out through a filter where insoluble portions (resins, waxes and other solids) are removed, and in a subsequent vessel (Separator 3) the caffeine solution is cooled as far as possible. As the solubility of caffeine in water is highly dependent on the temperature, the pre-purified caffeine precipitates to a large extent and can be further processed in a known per se manner. The remaining solution is either discarded or optionally concentrated by evaporation.

The gaseous mixture leaving the top of separator 2 and consisting of carbon dioxide, water and aroma components is cooled in order to lower its water contents (dewpoint deprssion) and re-added to the decaffeinated, dried tea. This is suitably carried out by adding the aroma components during the cooling step after drying.

The sensorial testing of the tea treated according to the invention shows its qualitative superiority with respect to tea samples having been prepared according to known, single-step processes, i.e. without aroma separation and aroma re-addition.

The tea treated according to the present invention is at least of equal value with respect to samples having been prepared according to processes encompassing an aroma re-impregnation.

I claim:

1. A process of the production of an aromatic decaffeinated tea comprising the steps of:

a) charging moist tea to a pressure vessel,
   b) charging liquid supercritical carbon dioxide to said pressure vessel at a temperature of between 0° to 100° C. and at a pressure of 100 to 500 bars to dissolve therein the caffeine and aroma fractions of said tea to provide a carbon dioxide solution,
   c) separating said carbon dioxide solution from said tea,
   d) charging said carbon dioxide solution to a first expansion vessel, reducing the pressure therein to 100 bars, raising the temperature to between 50° and 100° C. and continuously adding there 1 part by weight of water for each 10 parts by weight of originally charged moistened tea per hour,
   e) recovering the carbon dioxide thus converted to the gaseous state and recycling same into step (b) and collecting the thus produced aqueous extract containing aroma, caffeine, and some carbon dioxide,
   f) charging said aqueous extract to a second expansion vessel, lowering the pressure to 1 bar and reheating the contents to between 50° and 100° C. whereby the aromatics, some water and the carbon dioxide are volatilized,
   g) collecting the volatiles from step (f) and cooling same to between 0° and 40° C. whereby a portion of the water is condensed,
   h) charging the remaining volatiles to dearomatized decaffeinated tea to obtain aromatized decaffeinated tea.

2. A process of claim 1, wherein the dearomatized decaffeinated tea is dried after separation from the carbon dioxide in step (c).

3. A process of claim 1, wherein the volatiles of step (h) are charged to dearomatized decaffeinated tea during or after a step of drying said tea.

4. A process of claim 1, additionally comprising drying the decaffeinated rearomatized tea obtained in step (h).

5. A process of claim 1, wherein the temperature in step (d) is raised to between 70° and 90° C.

6. A process of claim 1, which additionally comprises the steps of collecting the aqueous residue of step (f) and filtering same.

7. A process according to claim 6 which comprises cooling said filtered solution to precipitate the caffeine therefrom.

8. A process according to claim 1, wherein the cooling of step (g) is carried out in the range of from 10° to 30° C.

* * * * *